(12) United States Patent
Yang et al.

(10) Patent No.: US 11,032,036 B2
(45) Date of Patent: Jun. 8, 2021

(54) CARRIER AGGREGATION (CA) OF MIXED NUMEROLOGIES

(71) Applicant: QUALCOMM Incorporated, San Diego, CA (US)

(72) Inventors: Yang Yang, San Diego, CA (US); Wanshi Chen, San Diego, CA (US); Peter Gaal, San Diego, CA (US); Heechoon Lee, San Diego, CA (US); Joseph Binamira Soriaga, San Diego, CA (US); Chih-Ping Li, San Diego, CA (US); Bilal Sadiq, Basking Ridge, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/101,255

(22) Filed: Aug. 10, 2018

(65) Prior Publication Data

US 2019/0052419 A1 Feb. 14, 2019

Related U.S. Application Data

(60) Provisional application No. 62/544,689, filed on Aug. 11, 2017.

(51) Int. Cl.
| | |
|---|---|
| *H04L 5/00* | (2006.01) |
| *H04W 72/12* | (2009.01) |
| *H04L 1/18* | (2006.01) |
| *H04W 72/04* | (2009.01) |

(52) U.S. Cl.
CPC ............ *H04L 5/001* (2013.01); *H04L 1/1812* (2013.01); *H04L 5/0055* (2013.01); *H04W 72/0446* (2013.01); *H04W 72/0453* (2013.01); *H04W 72/1205* (2013.01); *H04W 72/1278* (2013.01); *H04L 5/005* (2013.01); *H04L 5/0051* (2013.01);
(Continued)

(58) Field of Classification Search
CPC ..... H04L 5/001; H04L 1/1812; H04L 5/0053; H04L 5/0051; H04L 5/005; H04L 5/0055; H04W 72/1205; H04W 72/0453; H04W 72/0446; H04W 72/1273; H04W 72/1278
See application file for complete search history.

(56) References Cited

U.S. PATENT DOCUMENTS

| | | | |
|---|---|---|---|
| 2014/0198664 A1* | 7/2014 | Chen | H04W 52/38 370/241 |
| 2017/0310447 A1* | 10/2017 | Kusashima | H04J 11/00 |
| 2017/0332359 A1* | 11/2017 | Tsai | H04B 7/0617 |

(Continued)

OTHER PUBLICATIONS

Intel Corporation: "Scheduling and UCI Feedback for Carrier Aggregation", 3GPP Draft; R1-1710578, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017 Jun. 26, 2017, XP051299779, Retrieved from the Internet: URL:http://www.3gpp.org/ftp/Meetings_3GPP_SYNC/RAN1/Docs/ [retrieved on Jun. 26, 2017], 5 pages.

(Continued)

*Primary Examiner* — Walter J Divito
(74) *Attorney, Agent, or Firm* — Kevin T. Cheatham

(57) ABSTRACT

Certain aspects of the present disclosure relate to methods and apparatus for handling carrier aggregation (CA) involving component carriers (CCs) having different numerologies.

20 Claims, 17 Drawing Sheets

1500

1502
SCHEDULE, VIA A FIRST COMPONENT CARRIER (CC) HAVING A FIRST NUMEROLOGY, A USER EQUIPMENT (UE) FOR AT LEAST ONE DOWNLINK TRANSMISSION IN THE FIRST CC AND AT LEAST ONE DOWNLINK TRANSMISSION IN A SECOND CC

1504
RECEIVE, FROM THE UE, UPLINK CONTROL INFORMATION (UCI) IN ONE OF THE FIRST OR SECOND CCS CARRYING FEEDBACK FOR DOWNLINK TRANSMISSIONS SENT IN BOTH THE FIRST AND SECOND CC

(52) U.S. Cl.
CPC ....... *H04L 5/0053* (2013.01); *H04W 72/1273* (2013.01)

(56) References Cited

U.S. PATENT DOCUMENTS

| | | | |
|---|---|---|---|
| 2018/0098345 A1* | 4/2018 | Tiirola | H04W 72/1289 |
| 2018/0102892 A1* | 4/2018 | Lunttila | H04L 1/1607 |
| 2019/0053227 A1* | 2/2019 | Huang | H04L 25/03006 |
| 2019/0165904 A1* | 5/2019 | Jo | H04J 11/00 |
| 2020/0007300 A1* | 1/2020 | Wang | H04L 5/0094 |

OTHER PUBLICATIONS

Intel Corporation: "HARQ-ACK Multiplexing and Bundling", 3GPP Draft; R1-1710572 Intel HARQ Multiplex Bundling, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017 Jun. 26, 2017, XP051299779, Retrieved from the Internet: URL:http://www.3gpp.org/ftp/Meetings_3GPP_SYNC/RAN1/Docs/ [retrieved on Jun. 26, 2017], 5 pages.
LG Electronics: "Support of Cross-CC DCI/UCI Transmission for NR CA", 3GPP Draft; R1-1710339 NR-CA_FINAL, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017 Jun. 26, 2017, XP051299554, Retrieved from the Internet: URL:http://www.3gpp.org/ftp/Meetings_3GPP_Sync/RAN1/Docs/ [retrieved on Jun. 26, 2017], 7 pages.
Partial International Search Report—PCT/US2018/046396—ISA/EPO—dated Oct. 25, 2018.
Nokia et al., "On Cross-Carrier Scheduling and Joint UCI Design", 3GPP Draft; R1-1710885_CA_HARQ_CROSS-NUMEROLOGY, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017 Jun. 26, 2017, XP051300087, Retrieved from the Internet: URL:http://www.3gpp.org/ftp/Meetings_3GPP_SYNC/RAN1/Docs/ [retrieved on Jun. 26, 2017], 6 pages.
Qualcomm Incorporated: "CA with Mixed Numerology", 3GPP Draft; R1-1711209 CA With Mixed Numerology, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017 Jun. 26, 2017, XP051300408, Retrieved from the Internet: URL:http://www.3gpp.org/ftp/Meetings_3GPP_SYNC/RAN1/Docs/ [retrieved on Jun. 26, 2017], 2 pages.
International Search Report and Written Opinion—PCT/US2018/046396—ISA/EPO—dated Dec. 20, 2018.

* cited by examiner

CARRIER AGGREGATION (CA) OF MIXED NUMEROLOGIES

CLAIM OF PRIORITY UNDER 35 U.S.C. § 119

This application claims the benefit of U.S. Provisional Patent Application Ser. No. 62/544,689, filed Aug. 11, 2017, which is herein incorporated by reference in its entirety.

FIELD

The present disclosure relates generally to wireless communication systems, and more particularly, to methods and apparatus for carrier aggregation (CA) where different numerologies are used in different component carriers CCs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or $5^{th}$ generation (5G) network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a base station (BS). The method generally includes scheduling, via a first component carrier (CC) having a first numerology, a user equipment (UE) for at least one downlink transmission in the first CC and at least one downlink transmission in a second CC and receiving, from the UE, uplink control information (UCI) in one of the first or second CCs carrying feedback for downlink transmissions sent in both the first and second CC.

Certain aspects provide a method for wireless communications by a user equipment (UE). The method generally includes receiving scheduling, via a first component carrier (CC) having a first numerology, for at least one downlink transmission in the first CC and at least one downlink transmission in a second CC and transmitting uplink control information (UCI) in one of the first or second CCs carrying feedback for downlink transmissions sent in both the first and second CC.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
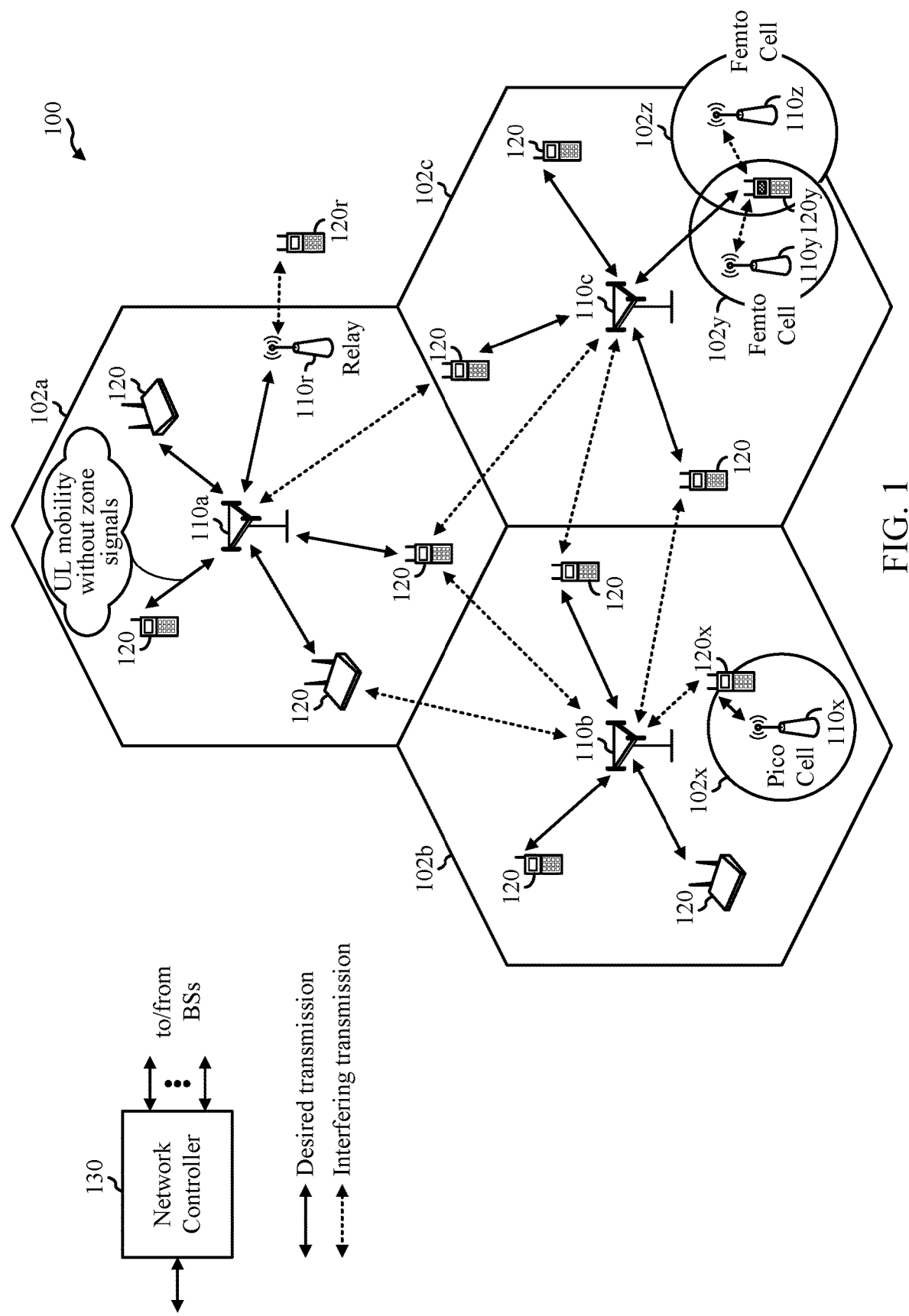
FIG. 1 is a block diagram conceptually illustrating an example telecommunications system, in accordance with certain aspects of the present disclosure.

Aspects of the present disclosure generally provide techniques for handling aggregation of component carriers (CCs) that have different numerologies. The techniques may be applied, for example, in new radio (NR), also referred to as 3$^{rd}$ Generation Partnership Project (3GPP) 5$^{th}$ Generation (5G) radio access technology.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth (e.g., system frequency band) into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. In some cases, the spacing between adjacent subcarriers may be fixed, and the total number of subcarriers (K) depends on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
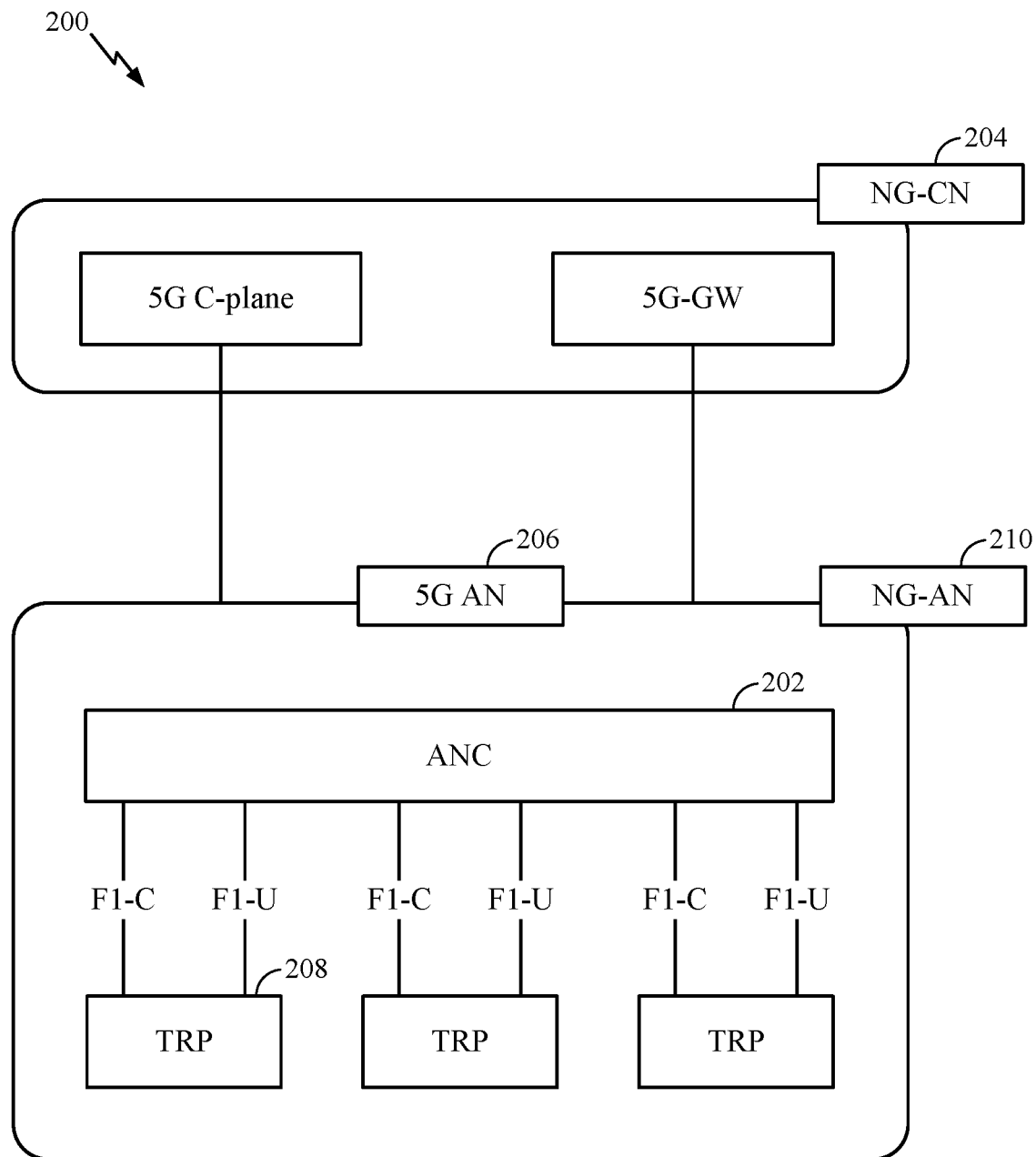
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
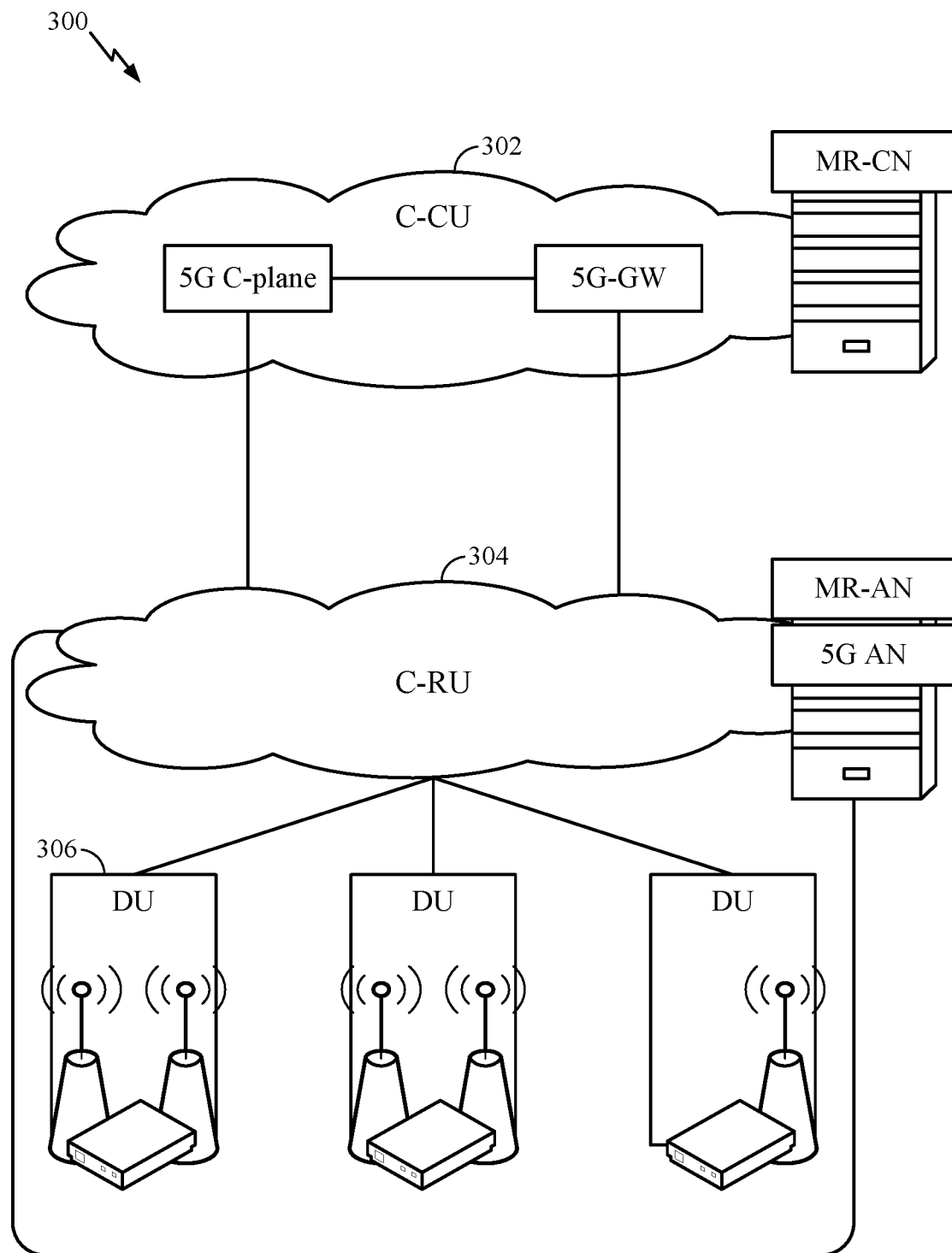
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
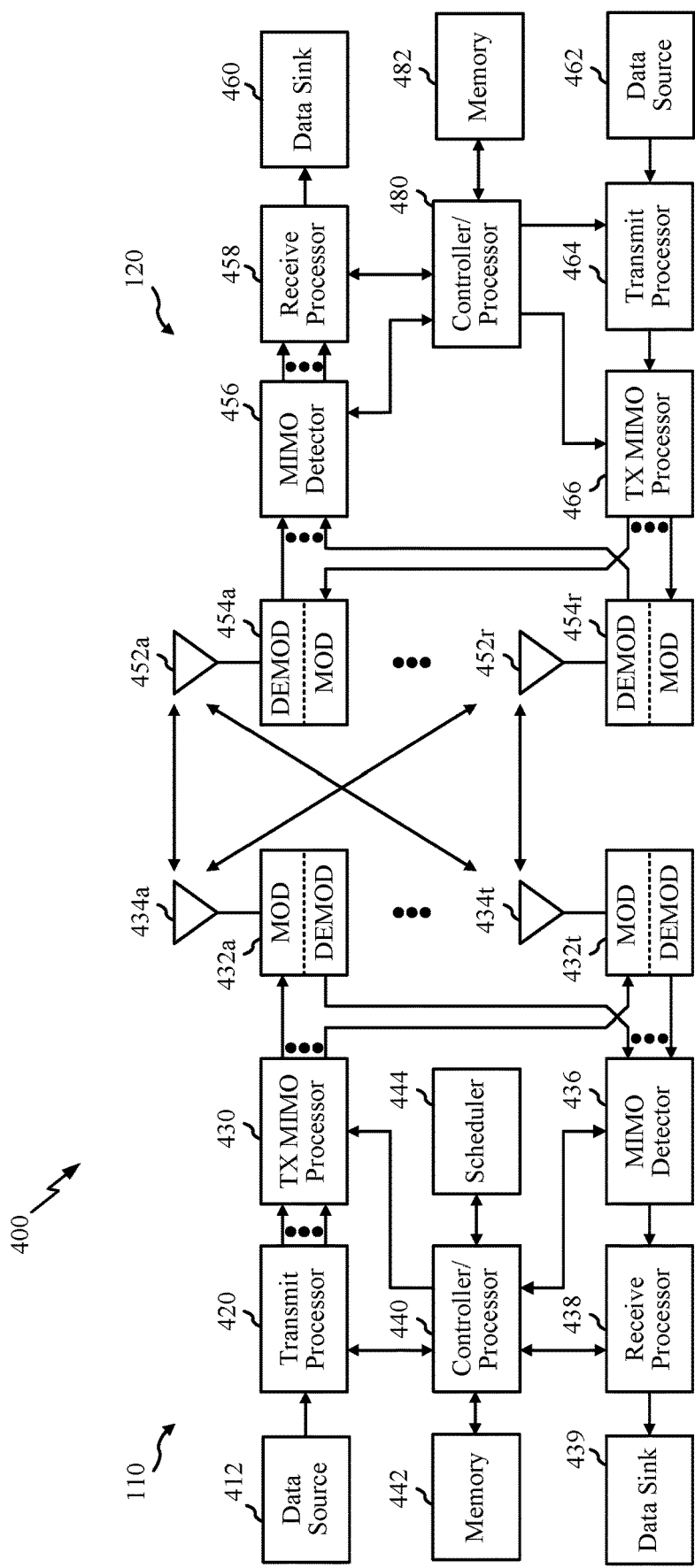
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 9-10.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIGS. 9-10, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
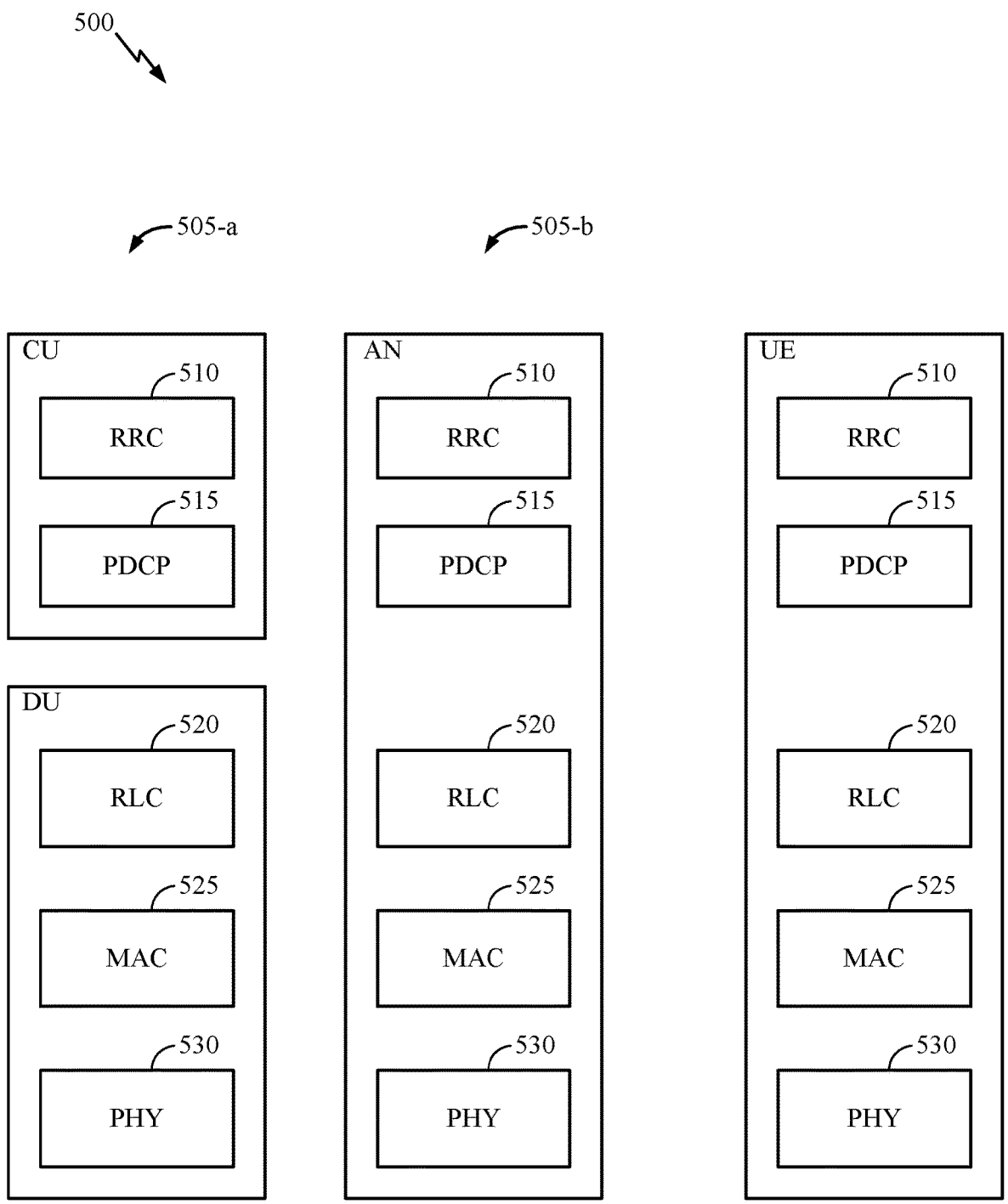
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
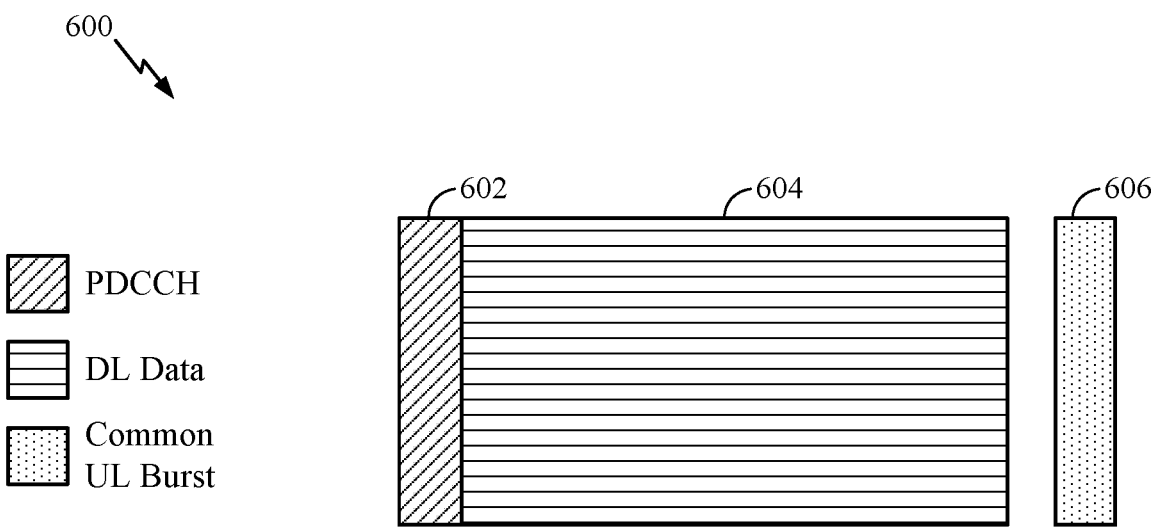
FIG. 6 illustrates an example of a downlink-centric (DL-centric) subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a hybrid acknowledgment retransmission request (HARQ) indicator, and/or various other suitable types of information. The common UL portion 606 may include additional or alternative information, such as information pertaining to random access channel (RACH) procedures, scheduling request (SRs transmissions, and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

While the subframe illustrated in FIG. 6 is shown as being one transmission time interval (TTI), in some numerologies in NR, such as those using a subcarrier spacing (SCS) or more than 15 kHz, a subframe may be divided into a plurality of slots. A subframe divided into a plurality of slots is discussed below, with reference to FIG. 8. In CA cases, certain information (such as UCI that contains acknowledgement or negative acknowledgement information) may only be available in a subset of slots in one CC.

Figure 7:
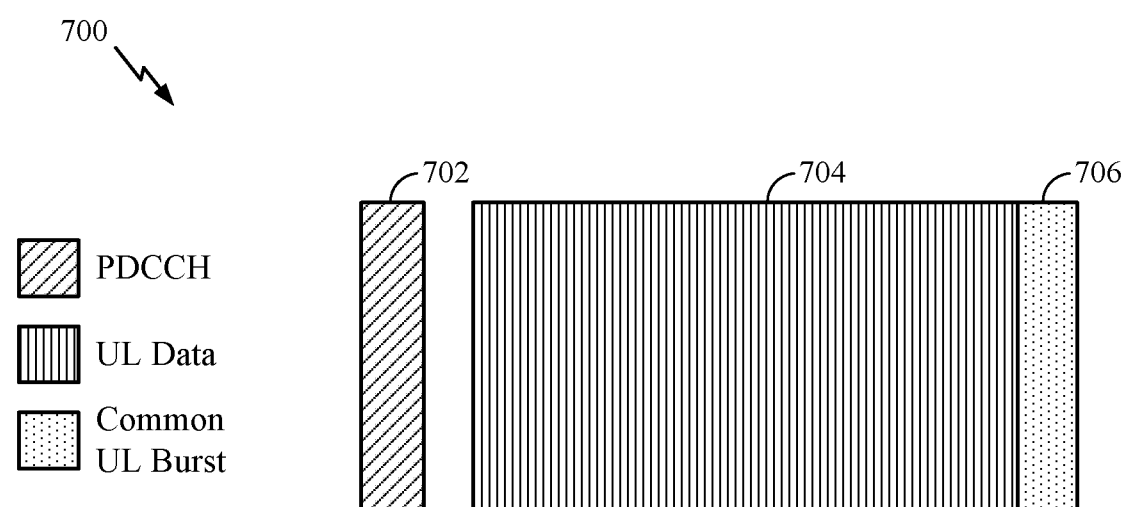
FIG. 7 illustrates an example of an uplink-centric (UL-centric) subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

While the subframe illustrated in FIG. 7 is shown as being one transmission time interval (TTI), in some numerologies in NR, such as those using a subcarrier spacing (SCS) or more than 15 kHz, a subframe may be divided into a plurality of slots. A subframe divided into a plurality of slots is discussed below, with reference to FIG. 8.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Carrier Aggregation (CA) of Mixed Numerologies

In various deployments, such as 3GPP's 5G (also referred to as new radio (NR)) wireless communication standards, aggregation of multiple component carriers (CCs) is supported. With such carrier aggregation (CA), same-carrier or cross-carrier scheduling is available. As the name implies, same-carrier scheduling refers to conveying a grant in one component carrier to schedule a (subsequent uplink or downlink) transmission in the same carrier. Cross-carrier scheduling, on the other hand, refers to conveying a grant in one component carrier to schedule a transmission in a different carrier.

In NR CA and dual connectivity (DC) scenarios, it is possible for different component carriers involved to have different numerologies. As used herein, the term numerology generally refers to a set of parameters that define a structure of time and frequency resources used for communication. Such parameters may include, for example, subcarrier spacing (SCS), type of cyclic prefix (CP) such as normal CP (NCP) or extended CP (ECP), and transmission time intervals (TTIs), such as subframe or slot durations.

NR may need to cover a wide range of carrier frequencies, including sub-6 GHz and millimeter wave (mmW) carrier frequencies. In addition, different transmission time intervals (TTIs) may be supported, such as different slot durations (e.g., 1 ms, 0.5 ms, 0.25 ms & 0.125 ms), with 14 or 7 symbols per slot. Different subcarrier spacing (SCS) or tone spacing may also be supported (e.g., 15 kHz, 30 kHz, 60 kHz, 120 kHz, and the like). Thus, NR CA and/or DC may need to accommodate different numerologies, for example, depending on the different CCs configured for a UE.

Figure 8:
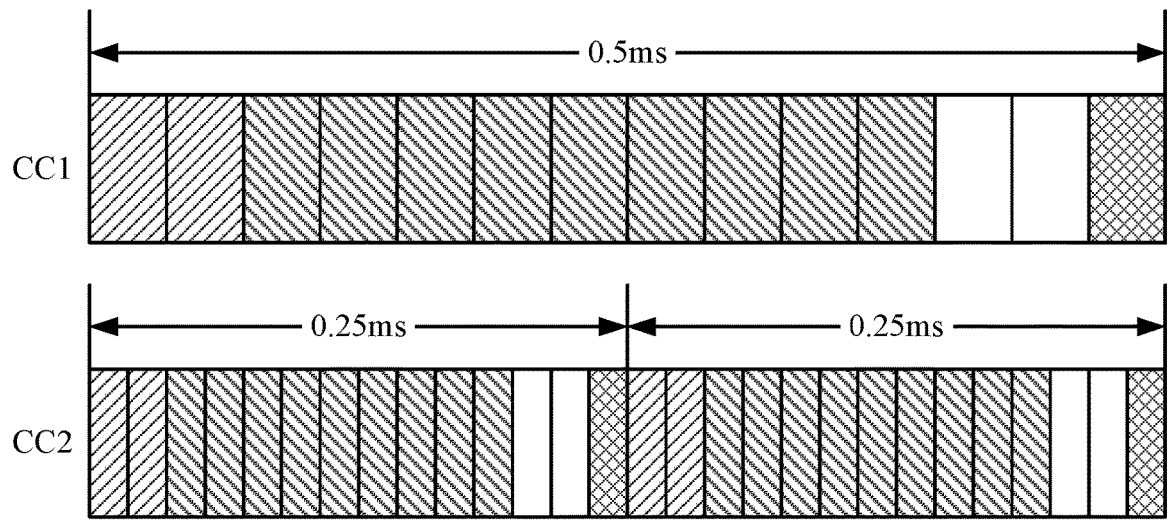
FIGS. 8 & 9 illustrate examples of component carriers (CCs) with different numerologies, in accordance with aspects of the present disclosure.
Figure 9:
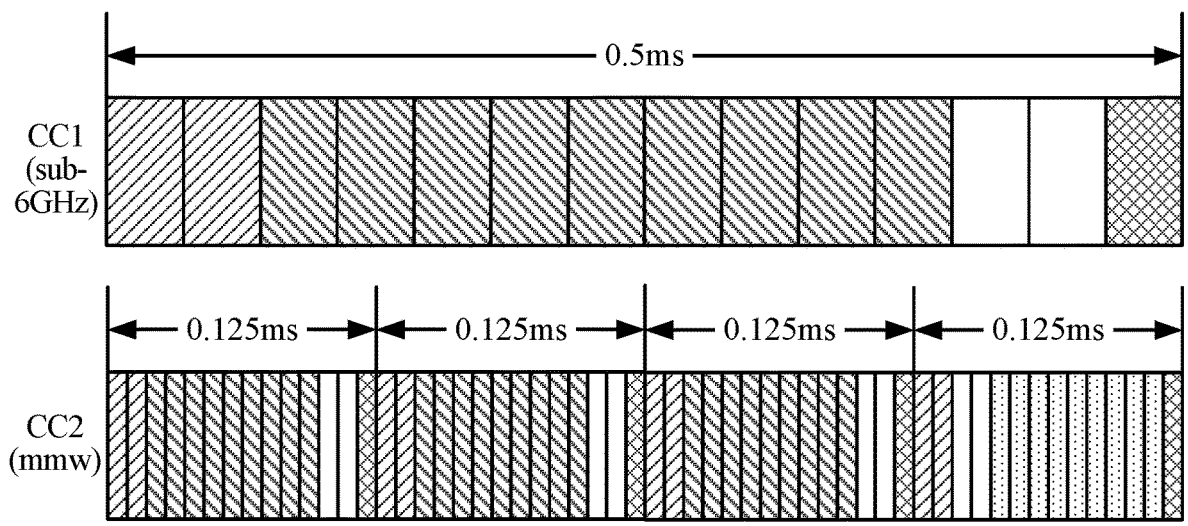

FIGS. 8 & 9 illustrate examples of CCs with different numerologies that may be configured for a UE for CA/DC in NR.

As illustrated in FIG. 8, a first CC (CC1) may have a 30 kHz tone spacing and a slot of 0.5 ms with 14 symbols, while a second CC (CC2) may have a 60 kHz tone spacing, a slot of 0.25 ms with 14 symbols. In the example shown in FIG. 9, CC1 may be a sub-6 GHz CC, with a 30 kHz tone spacing and a subframe of 0.5 ms with 14 symbols, while CC2 may be a mmW CC with a 120 kHz tone spacing and a subframe of 0.125 ms with 14 symbols.

Various agreements may be implemented regarding CA and/or DC deployments. For example, regarding search space (generally referring to a set of resources a device monitors for valid decoding "candidates" that fit a defined criteria), a UE may monitor PDCCH candidates in one or more common search spaces (CSSs) at least for remaining minimum system information (RMSI) and UE specific search space(s) (UESS) on Primary Component Carrier (PCC). A UE may monitor for PDCCH candidates at least in a UE specific search space (UESS) for a Secondary Component Carrier (SCC).

Support for cross-carrier scheduling may be via a carrier indication flag (CIF), for example, that indicates a corresponding grant schedules an uplink/downlink transmission on a different CC than the one carrying the grant. NR may at least support that a carrier is scheduled by one and only one carrier. The number of CIF bits may vary or may be determined based on various considerations. In some cases, multiple timing advance groups may be supported (e.g., with LTE timing difference requirements used as a starting point). NR may also support PRACH transmission for timing advance acquisition on an SCC. NR may support multiple cell groups for PUCCH for NR DC and/or CA.

For cross-carrier scheduling, PDCCH and the PDSCH scheduled by the PDCCH can have the same or different numerologies. For self-scheduling (scheduling a transmission on the same CC carrying the grant), the CC carrying PDCCH and the CC for the scheduled PDSCH may have the same numerology or different numerologies.

When numerologies are different between PDCCH and the scheduled transmission, the time granularity indicated in the DCI for the timing relationship between the end of PDCCH and the corresponding scheduled transmission may be based on the numerology of the CC for the scheduled transmission. This timing may be in units of symbols (e.g., for timing N0 and N2), where the symbol duration is based on PDSCH or PUSCH (and N0 and/or N2 may be integer or fractional numbers). The starting of PDSCH/PUSCH may be the earliest starting symbol, however, it may be possible to have a non-aligned starting symbol (e.g., a first starting symbol for a first RB and a second starting symbol for a second RB) for PDSCH (or PUSCH).

Figure 10:
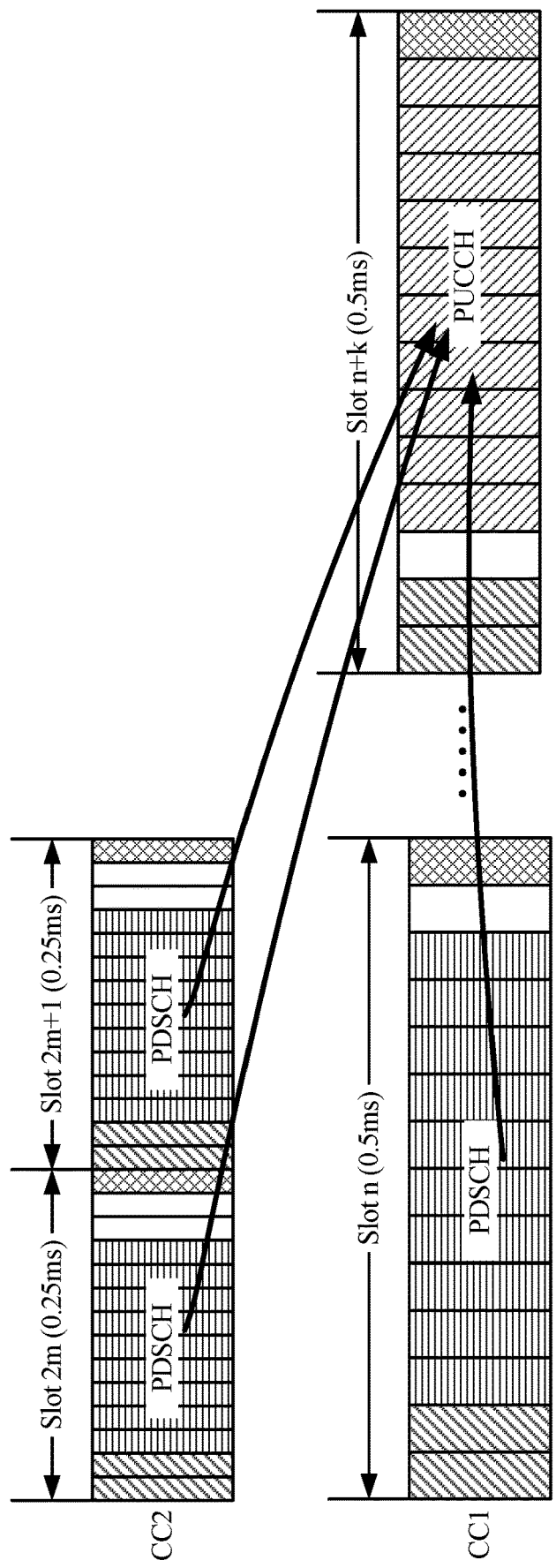
FIG. 10 illustrates an example of timing for uplink control information (UCI) timing, in accordance with aspects of the present disclosure.

As illustrated in FIG. 10, uplink control information (UCI), such as HARQ-ACK transmissions, related to multiple DL component carriers may be supported for DL CCs operating with the same or different numerologies. The time granularity of a HARQ-ACK transmission, indicated in the DCI scheduling the PDSCH, may be based on the numerology of PUCCH transmission. For example, as illustrated in FIG. 10, HARQ-ACK may be carried in a PUCCH transmitted in CC1 k slots after a PDSCH transmission in slot n in CC1.

Figure 11A:
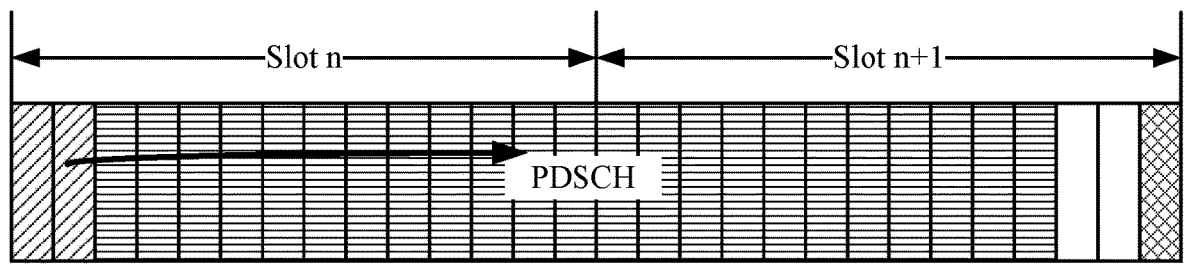
FIGS. 11A and 11B illustrate examples of slot aggregation, in accordance with aspects of the present disclosure.
Figure 11B:
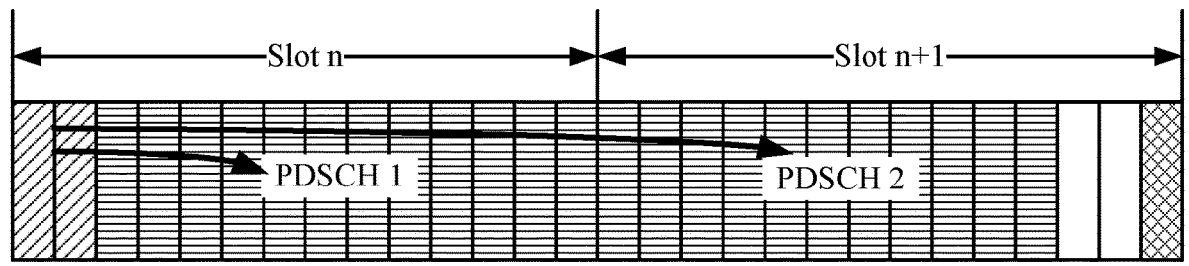

As illustrated in FIG. 11A, in some cases, a single transport block may span two or more slots. In some cases, efficient operation may be achieved by reusing the gap period (GP)/UL common burst/DL control region originally designated for self-contained slot for PDSCH. For example, as illustrated in FIG. 11B, it is also possible to have multi-slot scheduling with the last symbols of slot n (previously used for the GP/UL common burst) and/or the first few symbols of slot n+1 (previously used for the DL common burst) used for PDSCH transmissions.

Figure 12:
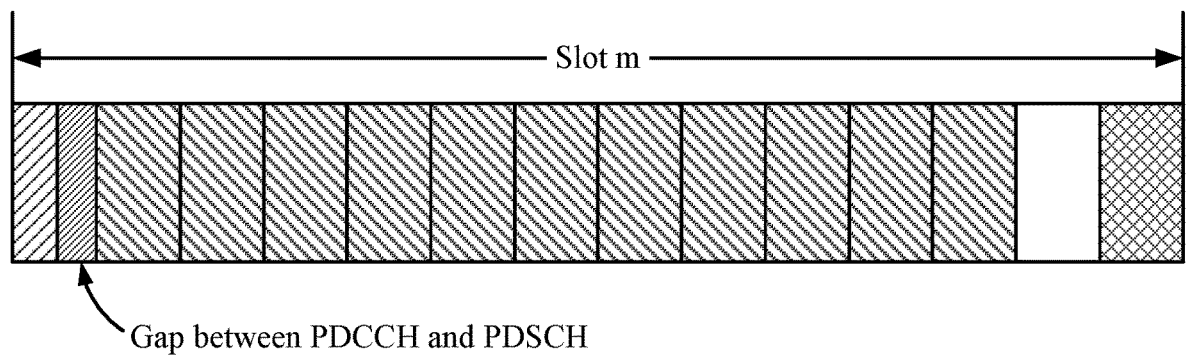
FIG. 12 illustrates example of self-scheduling, in accordance with aspects of the present disclosure.

As illustrated in FIG. 12, it is also possible, for self-scheduling, that PDCCH and the scheduled PDSCH can have different numerologies. In some cases, to accommodate the different numerologies, various constraints may be put in place. For example, one possible constraint is to restrict the SCS for PDCCH to be no smaller than the SCS for PDSCH on the same carrier. Such a constraint may help avoid a potential gap between PDCCH and PDSCH. In some cases, however, as illustrated in FIG. 12, gaps may potentially exist between PDCCH and PDSCH (e.g., with control 30 kHz, data 15 kHz, with 1 control symbol).

Figure 13A:
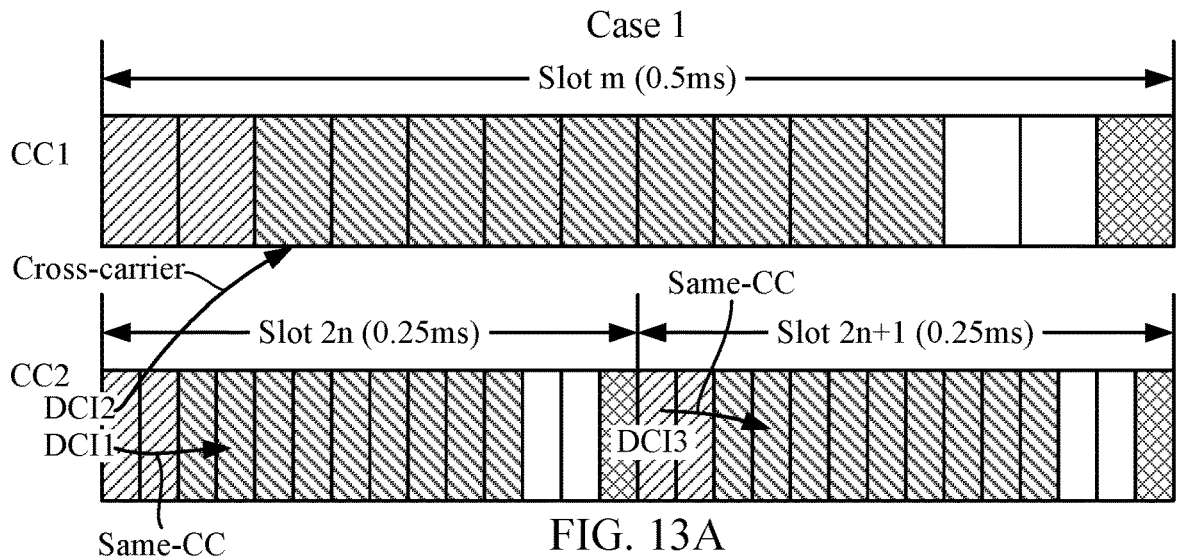
FIGS. 13A, 13B, and 13C illustrate examples of cross-carrier scheduling, in accordance with aspects of the present disclosure.

There may be various DL control considerations when supporting cross-carrier scheduling with different numerologies. For example, as illustrated in FIG. 13A, in cases where scheduling occurs in a first CC with a larger SCS (greater spacing) than a CC in which the transmission is scheduled, cross-carrier grants may not necessarily be enabled in every slot. For example, in FIG. 13A, cross-carrier grants may not be allowed in slot 2n+1.

Figure 13B:
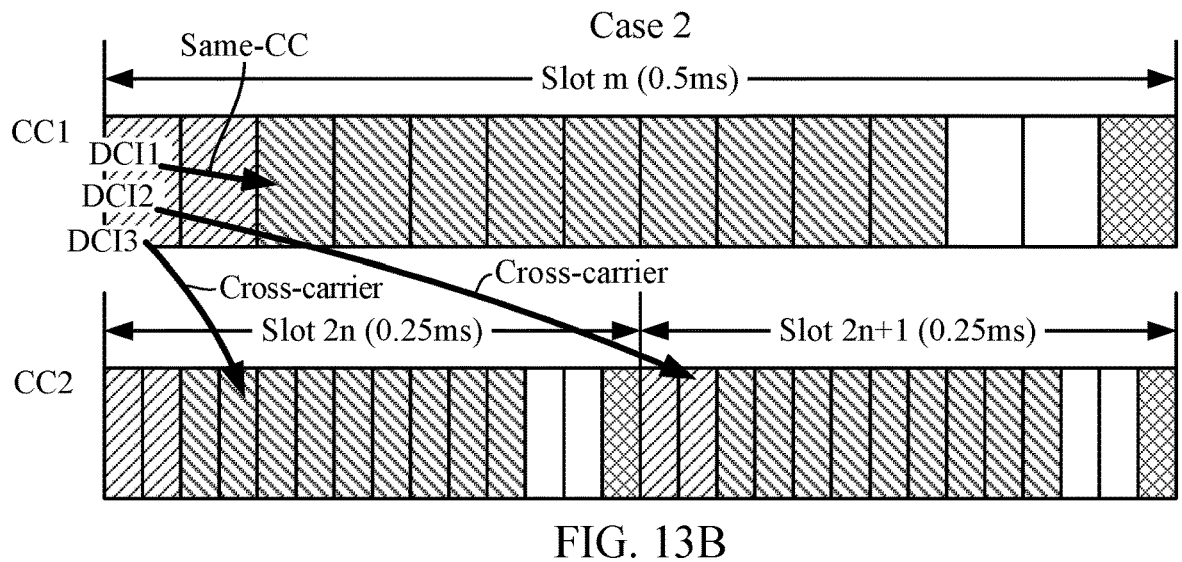

As illustrated in FIG. 13B, in cases where a small SCS (less spacing) CC is used for scheduling a transmission in a CC with a larger SCS (and correspondingly smaller TTI/slot duration), one slot may be schedule two or more slots. For example, in FIG. 13B, slot m on CC1 may schedule PDSCH or PUSCH on CC2 in slot 2n and slot 2n+1. In some cases, using a joint grant, a single DCI (on CC1) may schedule two or more PDSCHs (on CC2). In other cases, via separate grants, CC1 may carry two or more DCIs, each scheduling a respective PDSCH (on CC2).

The case shown in FIG. 13B is particularly possible for CA/DC scenarios involving sub-6 GHz (or simply "Sub6") and mmW CCs. For example, a Sub6 CC with small SCS may cross-carrier schedule transmissions on a mmW CC with larger SCS. If separate grants are used for the two or more slots, each slot may have its own search space. Alternatively, grants for the two or more slots may share the same search space, although the number of decoding candidates for an aggregation level may be limited and even smaller than the number of slots. To address this, in some cases, a same search space may be used, but with increased number of decoding candidates. The search spaces/spaces may be in the same or separate control resource sets (CORE-SETs, with a CORESET referring to a set of time and frequency resources for one search space). In some cases, there may be a need to differentiate grants for different slots. In such cases, a cross-slot indication may be provided in DCI (e.g., 1-bit, 00: scheduling slot 2n; 01: scheduling slot 2n+1).

Figure 13C:
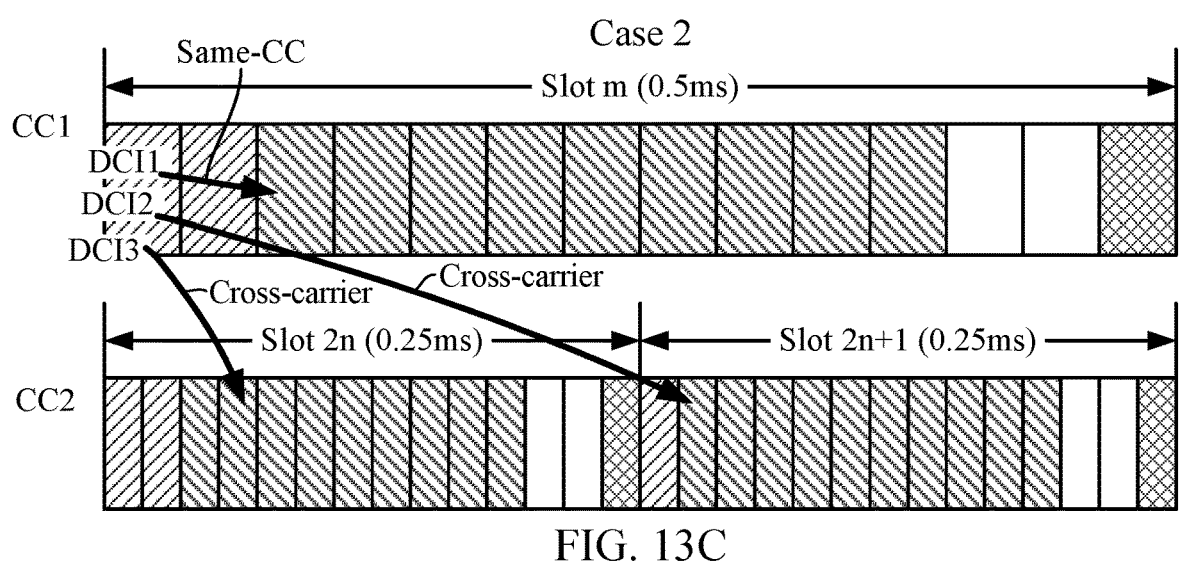

FIG. 13C illustrates an example with a joint grant in a CC1 with a smaller SCS than CC2 of the scheduled transmissions. Some information fields can be shared while other fields can be separate. For example, MCS/TBS size may be different, PDSCH/PUSCH starting and/or ending symbols may be different (semi-statically and/or dynamically determined). In some cases, SRS/CSI triggering may be only in the first slot, in all slots, or in some other combination of slots.

In some cases, a UE may skip monitoring DCI in a control region if a slot is previously scheduled. For example, in the example of FIG. 13C, the UE may skip monitoring DCI in slot 2n+1, given the joint grant (in slot m) scheduled a transmission in slot 2n+1. In such cases, the control region and/or GP and/or UL common burst may be reused for PDSCH. In some cases, rather than skip monitoring the entire control region, only a set of tones (used for PDSCH) may be skipped.

Figure 14A:
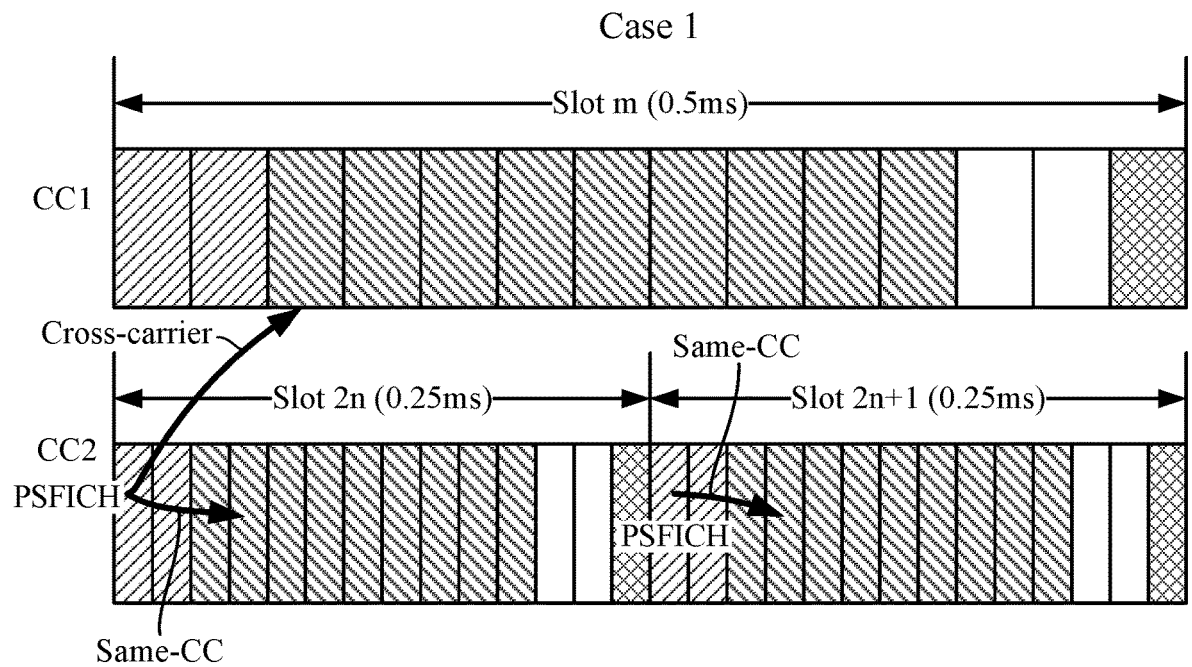
FIGS. 14A and 14B illustrate examples of group common physical downlink control channels (PDCCHs), in accordance with aspects of the present disclosure.
Figure 14B:
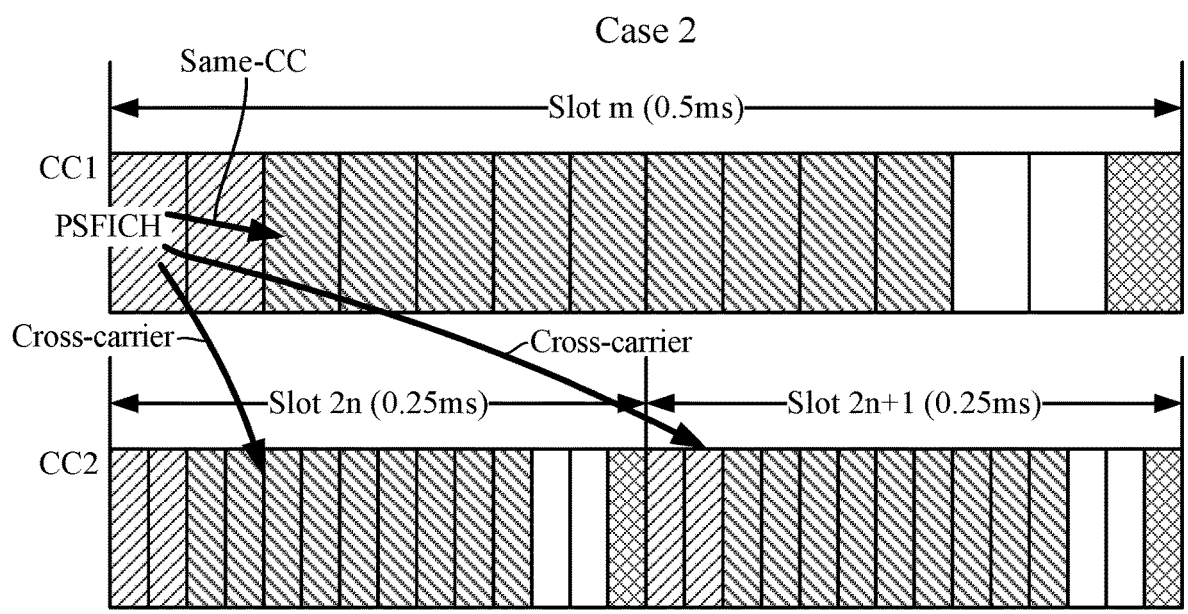

FIGS. 14A and 14B illustrate examples of a group common physical downlink control channel (PDCCH), in accordance with aspects of the present disclosure. As illustrated in the figures, a group-common-PDCCH (GC-PDCCH), which may be used to provide the UE with information about the physical slot format (slot format information or SFI), such as the length of the slot, symbols available for downlink transmission, and the symbols available for uplink transmission region.

Similar to PDCCH scheduling PDSCH/PUSCH, described above, group-common PDCCH (PSFICH) may have two cases as well. For example, in a first case shown in FIG. 14A, where PSFICH is sent in CC2 with a larger SCS (than CC1), PSFICH cross-carrier schedules (provides physical slot format information) for a CC1 with a smaller SCS. In FIG. 14B, where PSFICH is sent in CC1 with a smaller SCS, the PSFICH cross-carrier schedules ((provides physical slot format information) for CC2 with a larger SCS. These cases may be treated as described above.

Aspects of the present disclosure provide techniques for handling UCI (e.g., HARQ feedback) when using CCs with different numerologies.

Figure 15:
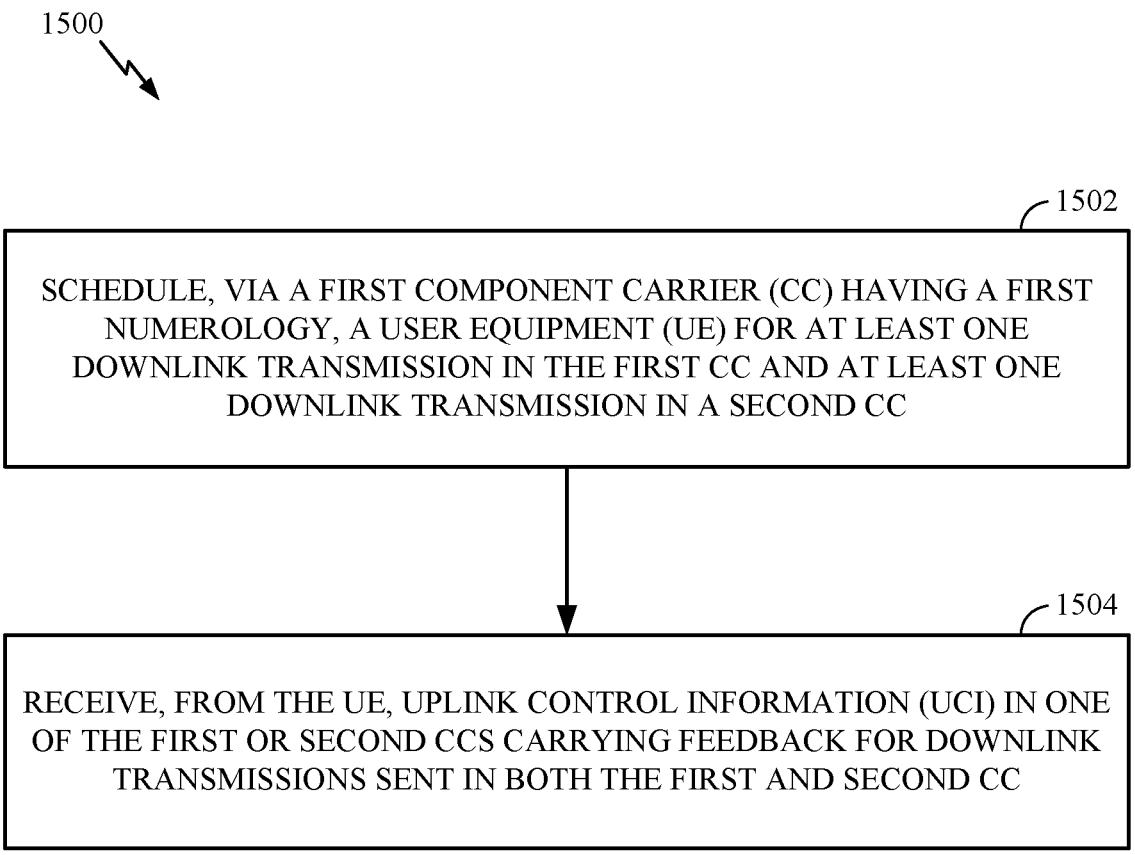
FIG. 15 illustrates example operations for wireless communications by a base station (BS), in accordance with certain aspects of the present disclosure.

For example, FIG. 15 illustrates example operations 1500 for wireless communications by a network entity (e.g., a gNB) using CCs with different numerologies, in accordance with certain aspects of the present disclosure.

Operations 1500 begin, at 1502, by scheduling, via a first component carrier (CC) that has a first numerology, a user equipment (UE) for at least one downlink transmission in the first CC and at least one downlink transmission in a second CC. At 1504, the gNB receives, from the UE, uplink control information (UCI) in one of the first or second CCs carrying feedback for downlink transmissions in both the first and second CC.

Figure 16:
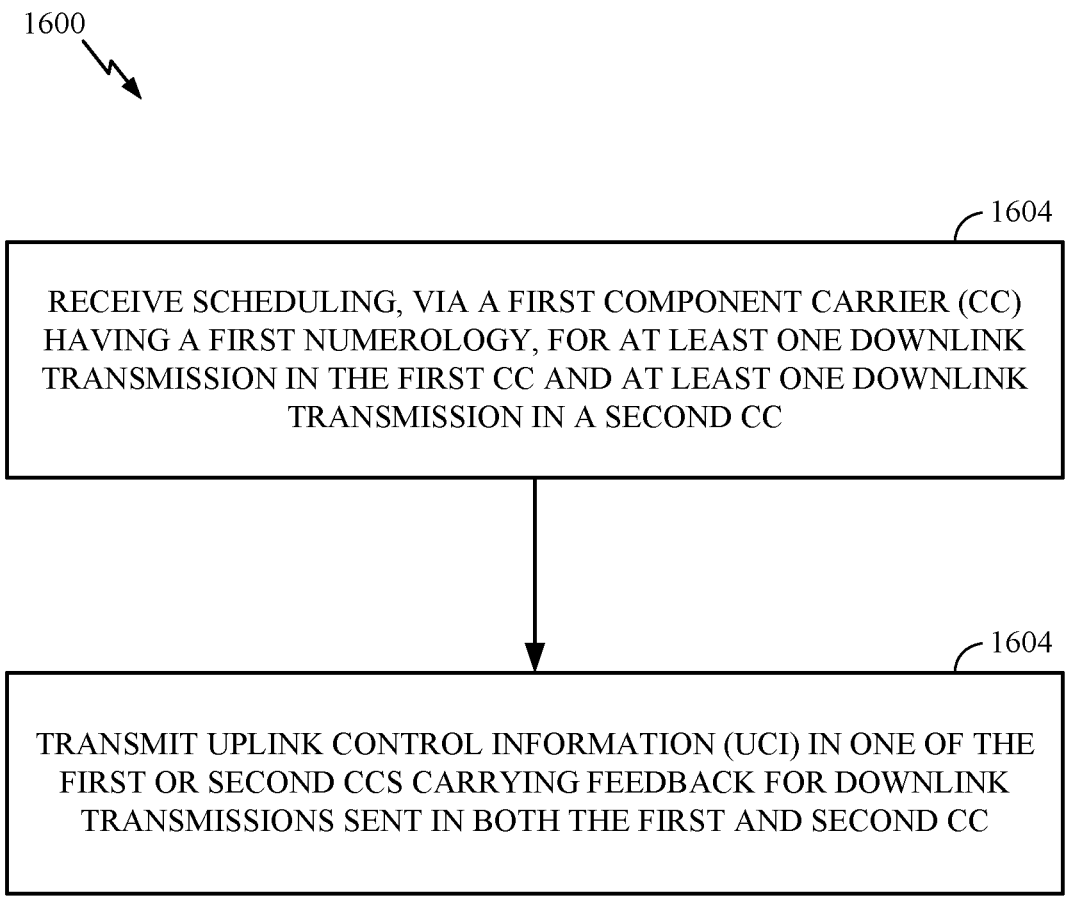
FIG. 16 illustrates example operations for wireless communications by a user equipment (UE), in accordance with certain aspects of the present disclosure.

FIG. 16 illustrates example operations 1600 for wireless communications by a user equipment (UE), in accordance with certain aspects of the present disclosure. For example, the operations 1600 may be performed by a UE communicating with a gNB performing operations 1500.

Operations 1600 begin, at 1602, by receiving scheduling, via a first component carrier (CC) having a first numerology, for at least one downlink transmission in the first CC and at least one downlink transmission in a second CC. At 1604, the UE transmits uplink control information (UCI) in one of the first or second CCs carrying feedback for downlink transmissions in both the first and second CC.

Figure 17:
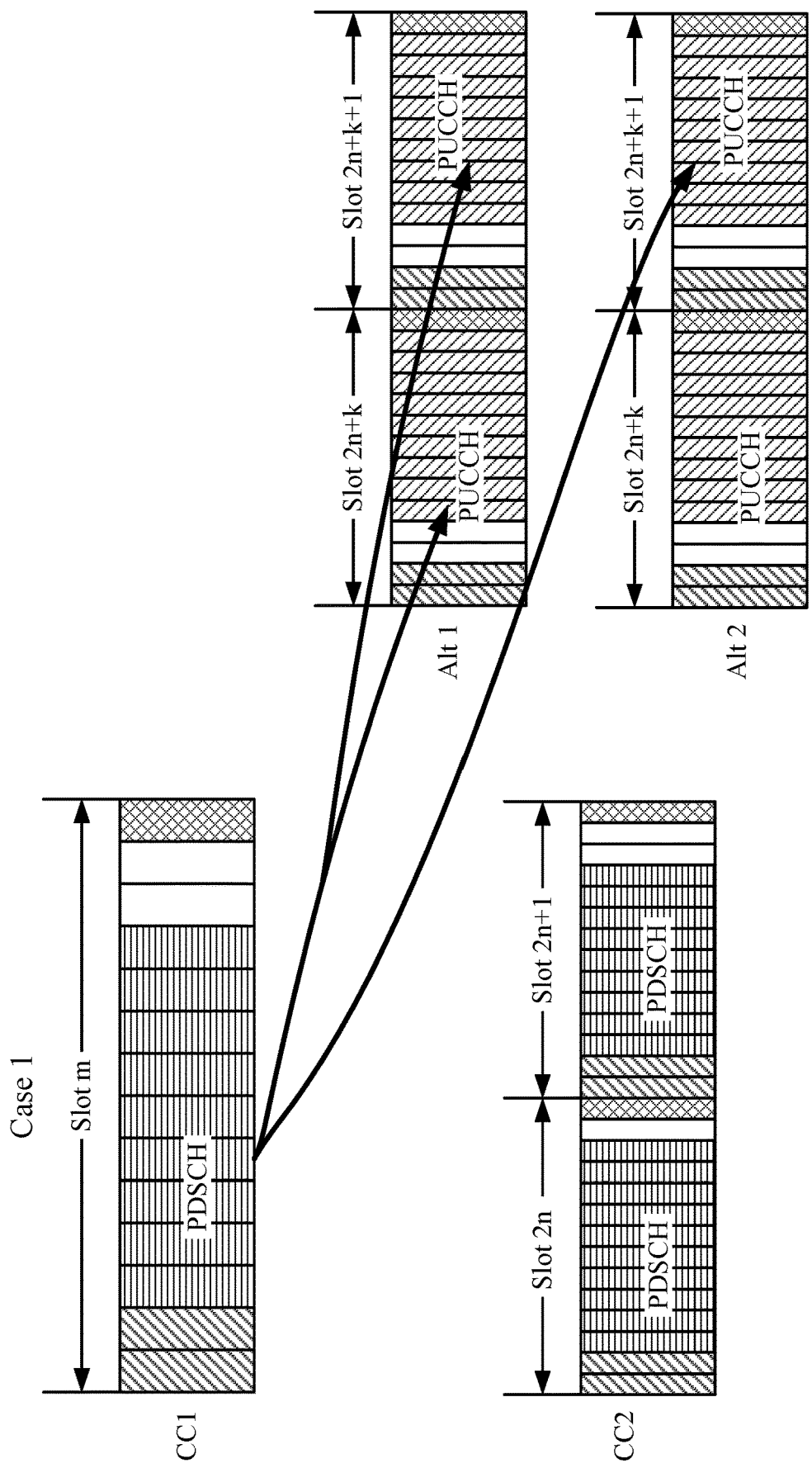
FIGS. 17 and 18 illustrate examples of UCI feedback handling, in accordance with aspects of the present disclosure.

FIG. 17 illustrates an example of how UCI may be handled in the case where CC1 with a smaller SCS cross-carrier schedules CC2 with a larger SCS (e.g., DL TTI>=UL TTI). In such cases, a single PUCCH may need to provide UCI (e.g., ACK/NAK, SR, CSI), particularly ACK/NAK feedback, for CCs of different numerologies.

As illustrated, in one alternative (labeled ALT 1), feedback of ACK/NACK (A/N) for CC1 may be transmitted in two or more PUCCHs on CC2 (e.g., for enhanced reliability). In another alternative (labeled ALT 2), feedback of A/N for CC1 is only in PUCCH on CC2 in some slot(s), for example, in slots 2n+k+1, but not in slots 2n+k. PUCCH to carry HARQ for a PDSCH in slot m of CC1 can be determined to be the same PUCCH carrying HARQ for slot 2n+1 of CC2 (last one in the bundle), for example, in order to provide reasonable/sufficient timing for processing (e.g., for demultiplexing/decoding) transmissions on CC1.

Figure 18:
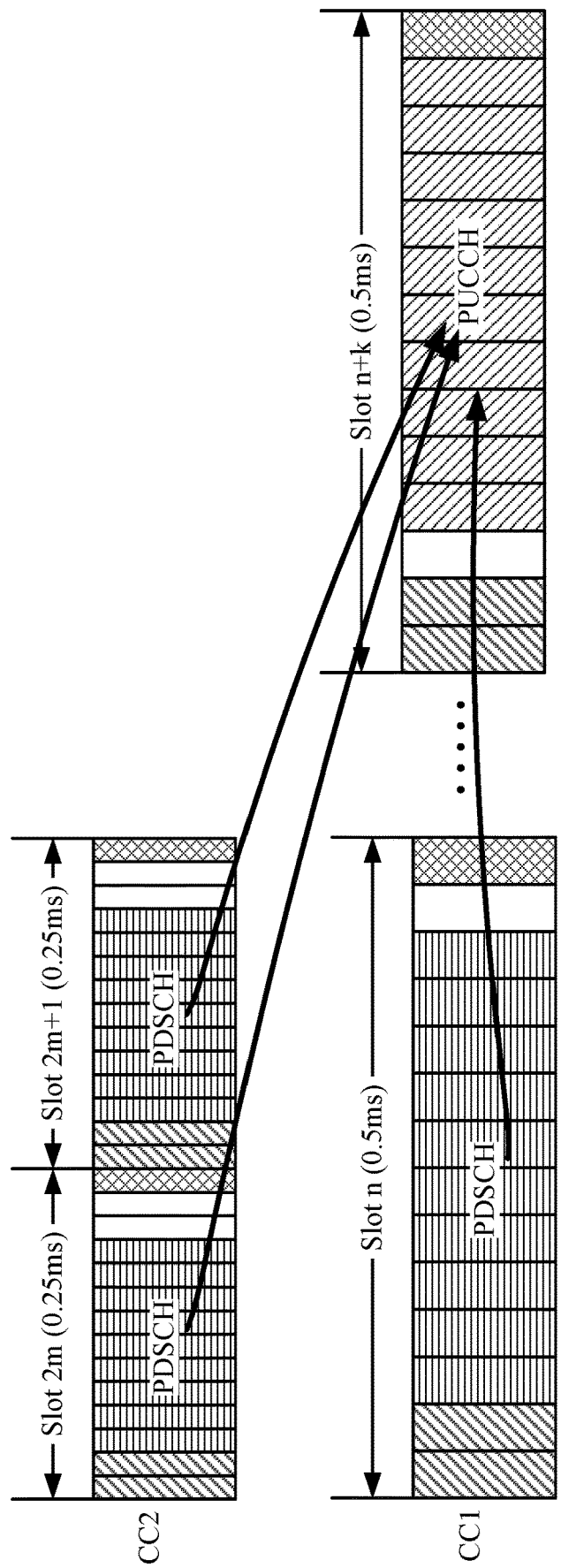

FIG. 18 illustrates an example of how UCI may be handled in the case where CC2 with a larger SCS cross-carrier schedules CC1 with a smaller SCS (e.g., DL TTI<UL TTI). This may be a typical case, for example, for Sub6 plus mmW CC CA/DC. As illustrated, one PUCCH may carry two or more PDSCHs (e.g., PUCCH in slot n+k on CC1 carries HARQ response for slots 2m and 2m+1 PDSCH transmissions on CC2). These ACK/NAK may be separately reported, or bundled (e.g., as a single ACK/NAK per TB) by performing time-domain bundling over different slots.

Due to longer TTI in UL, in the example shown in FIG. 18, the HARQ delay may be increased for slot 2m on CC2. In some cases, the number of HARQ processes for CC2 may be increased. For example, 8 HARQ processes may be supported for CC2 if CC2's HARQ response is carried by PUCCH of the same TTI (as PDSCH on CC2), but 16 HARQ processes may be supported for CC2 if the HARQ response (for CC2 transmissions) is carried by PUCCH on CC1 (longer TTI). In this case, the number of bits for HARQ processes can be 3 and 4, respectively.

Aspects of the present disclosure also provide techniques for handling downlink assignment index (DAI) management in cases with CCs with different numerologies. A DAI generally refers to a value transmitted to a UE by an eNB to indicate a number of Downlink TTIs with PDCCH to be acknowledged (e.g., the DAI value indicates the number of DL HARQ-ACK to be reported).

Figure 19A:
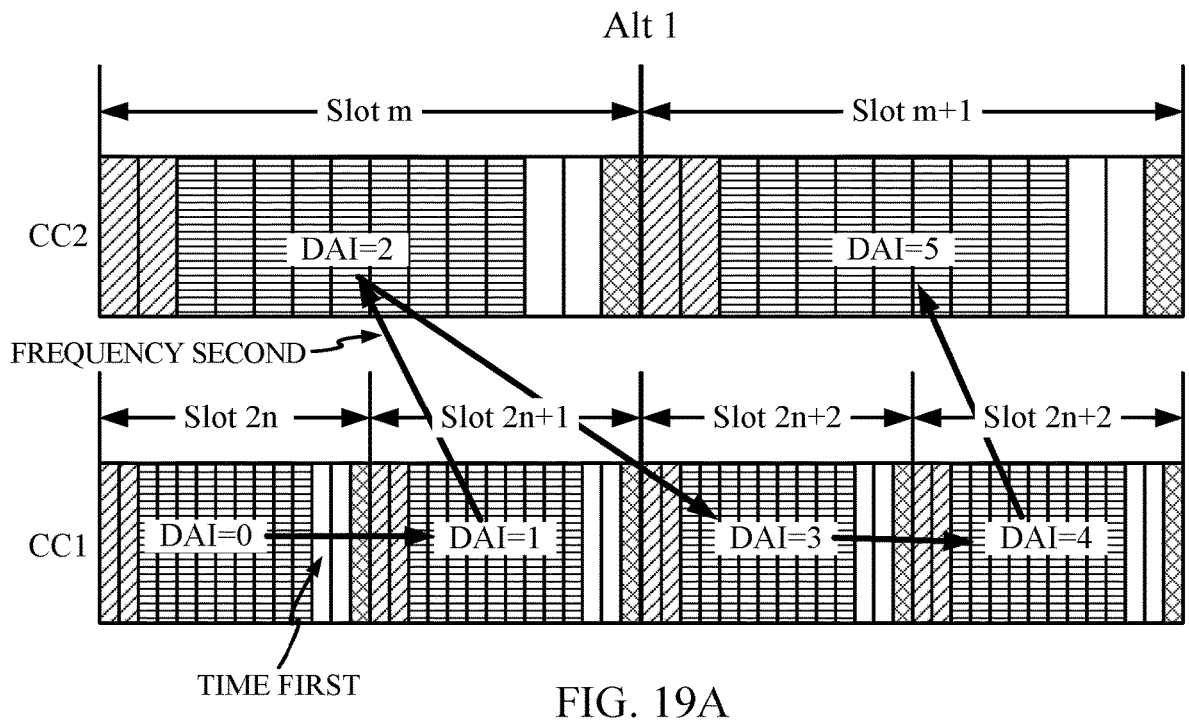
FIGS. 19A and 19B illustrate examples of downlink assignment index (DAI) management, in accordance with aspects of the present disclosure.
Figure 19B:
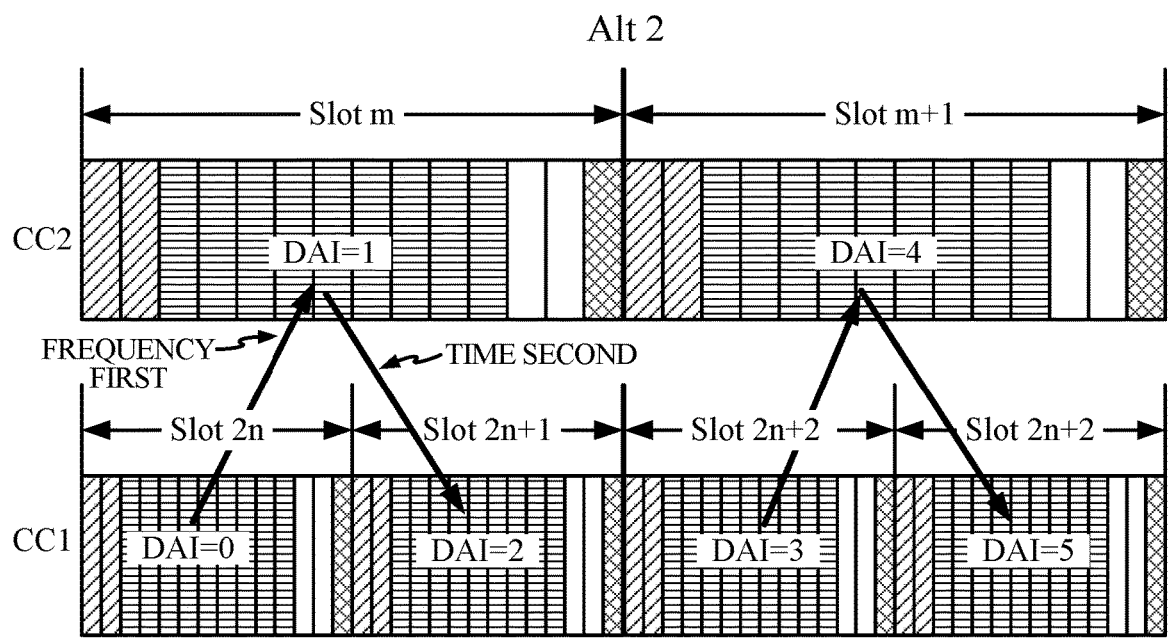

When there are CCs of different numerologies, the accumulative counter of DAI may be managed according to various alternatives for the given reference slot duration. For example, as illustrated in FIG. 19A, according to a first alternative (ALT 1), DAI may be incremented in a block-wise (e.g., where block refers to a given slot duration) time-first, frequency-second manner (e.g., DAI=0 in slot $2n$, then DAI=1 for slot $2n+1$ of CC1, before moving to CC2 for DAI=2 in slot m. As illustrated in FIG. 19B, according to a second alternative (ALT 2), DAIS may be assigned (incrementally) in a block-wise frequency-first, time-second manner (e.g., DAI=0 in slot $2n$ of CC1, then DAI=1 for slot m of CC2, then back to CC1 for DAI=2 for slot $2n+1$. In some cases, the second alternative (ALT 2) may be preferable since the gNB does not have to predict where slot $2n+1$ is to be scheduled or not when it is scheduling slot $2n$ and slot m.

In some cases, it is also possible for a UE to provide feedback on the number of ACK/NAK bits it is transmitting, which may help to minimize potential misalignment between UE and eNB regarding ACK/NAK payload size. In such cases, the gNB may first decode information regarding the number of ACK/NAK bits the UE is transmitting and, based on this information, process the actual ACK/NAK payload.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a network entity, comprising:
   scheduling, via a first component carrier (CC) having a first numerology, a user equipment (UE) for at least one downlink transmission in the first CC and at least one downlink transmission in a second CC having a second numerology;
   receiving, from the UE, uplink control information (UCI) in one of the first or second CCs carrying feedback for the downlink transmissions in both the first and second CCs, wherein the UCI comprises acknowledgement information bundled as a single acknowledgement or negative acknowledgment per data block over a plurality of time-domain resources;
   providing a downlink assignment index (DAI) for each of the downlink transmissions; and
   wherein DAIs are assigned to the downlink transmissions in a time-first, frequency-second manner.

2. The method of claim 1, wherein:
   the first numerology is defined by a first subcarrier spacing and a first transmission time interval (TTI); and
   the second numerology is defined by a second subcarrier spacing and a second transmission time interval (TTI).

3. The method of claim 1, wherein:
the first numerology has a transmission time interval (TTI) that is greater than a TTI of the second numerology; and
the UCI is provided in a plurality of PUCCH transmissions on the second CC.

4. The method of claim 1, wherein:
the first numerology has a transmission time interval (TTI) that is greater than a TTI of the second numerology; and
the UCI is available in only a subset of slots in the second CC.

5. The method of claim 4, wherein the UCI is available in a last slot of a bundle of slots.

6. The method of claim 1, wherein:
the first numerology has a transmission time interval (TTI) that is less than a TTI of the second numerology; and
the UCI is provided in a PUCCH on the second CC and for the downlink transmissions.

7. The method of claim 6, wherein the single acknowledgement or negative acknowledgment is bundled per transport block over multiple time slots.

8. The method of claim 6, wherein a number of hybrid acknowledgment retransmission request (HARQ) processes supported on at least one of the first or second CC depends on which of the first or second CC is used for HARQ feedback.

9. A method for wireless communications by a user equipment (UE), comprising:
receiving scheduling, via a first component carrier (CC) having a first numerology, for at least one downlink transmission in the first CC and at least one downlink transmission in a second CC having a second numerology;
transmitting uplink control information (UCI) in one of the first or second CCs carrying feedback for the downlink transmissions in both the first and second CCs, wherein the UCI comprises acknowledgment information bundled as a single acknowledgement or negative acknowledgment per data block over a plurality of time-domain resources;
receiving a downlink assignment index (DAI) for each downlink transmission; and
wherein DAIs are assigned to the downlink transmissions in a time-first, frequency-second manner.

10. The method of claim 9, wherein:
the first numerology is defined by a first subcarrier spacing and a first transmission time interval (TTI); and
the second numerology is defined by a second subcarrier spacing and a second transmission time interval (TTI).

11. The method of claim 9, wherein:
the first numerology has a transmission time interval (TTI) that is greater than a TTI of the second numerology; and
the UCI is provided in a plurality of PUCCH transmissions on the second CC.

12. The method of claim 9, wherein:
the first numerology has a transmission time interval (TTI) that is greater than a TTI of the second numerology; and
the UCI is available in only a subset of slots in the second CC.

13. The method of claim 12, wherein the UCI is available in a last slot of a bundle of slots.

14. The method of claim 9, wherein:
the first numerology has a transmission time interval (TTI) that is less than a TTI of the second numerology; and
the UCI is provided in a PUCCH on the second CC and for the downlink transmissions.

15. The method of claim 14, wherein the single acknowledgement or negative acknowledgment is bundled per transport block over multiple time slots.

16. The method of claim 14, wherein a number of hybrid acknowledgment retransmission request (HARQ) processes supported on at least one of the first or second CC depends on which of the first or second CC is used for HARQ feedback.

17. A method for wireless communications by a network entity, comprising:
scheduling, via a first component carrier (CC) having a first numerology, a user equipment (UE) for at least one downlink transmission in the first CC and at least one downlink transmission in a second CC having a second numerology;
receiving, from the UE, uplink control information (UCI) in one of the first or second CCs carrying feedback for the downlink transmissions in both the first and second CCs, wherein the UCI comprises acknowledgement information bundled as a single acknowledgement or negative acknowledgment per data block over a plurality of time-domain resources;
providing a downlink assignment index (DAI) for each of the downlink transmissions;
wherein DAIs are assigned to the downlink transmissions in a time-first, frequency-second manner;
transmitting a single downlink control information (DCI), via the first, to schedule the UE for at least two transmissions in the second CC; and
communicating with the UE according to the transmissions scheduled by the DCI.

18. The method of claim 17, wherein the DCI schedules at least two physical downlink shared channel (PDSCH) transmissions in the second CC.

19. A method for wireless communications by a user equipment (UE), comprising:
receiving scheduling, via a first component carrier (CC) having a first numerology, for at least one downlink transmission in the first CC and at least one downlink transmission in a second CC having a second numerology;
transmitting uplink control information (UCI) in one of the first or second CCs carrying feedback for the downlink transmissions in both the first and second CCs, wherein the UCI comprises acknowledgment information bundled as a single acknowledgement or negative acknowledgment per data block over a plurality of time-domain resources;
receiving a downlink assignment index (DAI) for each downlink transmission;
receiving a single downlink control information (DCI), from a base station via the first CC, scheduling the UE for at least two transmissions in the second CC;
communicating with the base station according to the transmissions scheduled by the DCI; and
wherein DAIs are assigned to the downlink transmissions in a time-first, frequency-second manner.

20. The method of claim 19, wherein the DCI schedules at least two physical downlink shared channel (PDSCH) transmissions in the second CC.

* * * * *